(12) United States Patent
Opletal et al.

(10) Patent No.: US 10,183,244 B2
(45) Date of Patent: Jan. 22, 2019

(54) FILTER ELEMENT WITH CENTRAL ELEMENT FOR A FILTER SYSTEM

(71) Applicant: MANN+HUMMEL GMBH, Ludwigsburg (DE)

(72) Inventors: Marc Opletal, Freiberg (DE); Gunther Kraft, Ludwigsburg (DE); Andreas Wildermuth, Marbach (DE); Steffen Meinhold, Oberndorf (DE); Markus Beylich, Ludwigsburg (DE); Frank Thomann, Weinheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 83 days.

(21) Appl. No.: 15/278,583

(22) Filed: Sep. 28, 2016

(65) Prior Publication Data
US 2017/0087486 A1 Mar. 30, 2017

(30) Foreign Application Priority Data
Sep. 29, 2015 (DE) .......................... 10 2015 012 473

(51) Int. Cl.
*B01D 29/96* (2006.01)
*B01D 29/15* (2006.01)
(Continued)

(52) U.S. Cl.
CPC ............. *B01D 29/96* (2013.01); *B01D 29/15* (2013.01); *B01D 29/21* (2013.01); *B01D 29/605* (2013.01); *B01D 35/005* (2013.01); *B01D 35/06* (2013.01); *B01D 35/18* (2013.01); *B01D 36/005* (2013.01); *B01D 2201/0415* (2013.01);
(Continued)

(58) Field of Classification Search
CPC ...... B01D 29/96; B01D 35/18; B01D 29/605; B01D 29/21; B01D 36/005; B01D 29/15; B01D 35/06; B01D 35/005; B01D 2201/4046; B01D 2201/34; B01D 2201/291; B01D 2201/295;
(Continued)

(56) References Cited

U.S. PATENT DOCUMENTS 4,372,847 A * 2/1983 Lewis .................... B01D 17/00
210/86
5,015,375 A 5/1991 Fleck
(Continued)

FOREIGN PATENT DOCUMENTS

DE 102011078362 A1 1/2013
DE 102014010997 A1 2/2016

*Primary Examiner* — Madeline Gonzalez
(74) *Attorney, Agent, or Firm* — James Hasselbeck

(57) ABSTRACT

A filter element (10) has a filter bellows (12) arranged about the longitudinal axis (L) and having a first end disk (14) on a first end face (26), and a second end disk (16) on a second end face (28). A central element (20) is arranged rotatably about the longitudinal axis (L) relative to the filter bellows (12) in the interior (18) of the filter bellows (12). The central element (20) has one or multiple positioning elements (22, 24) which interact with counter positioning elements (116, 118) of an upper housing part (114) to fix the central element in the upper housing part (114) in a defined angular position. The central element (20) has at least one electrical connector element (32) on the element, electrically contacting at least one electrical connector element (120) on the housing.

19 Claims, 7 Drawing Sheets

(51) Int. Cl.
*B01D 35/00* (2006.01)
*B01D 35/06* (2006.01)
*B01D 35/18* (2006.01)
*B01D 36/00* (2006.01)
*B01D 29/21* (2006.01)
*B01D 29/60* (2006.01)

(52) U.S. Cl.
CPC .. *B01D 2201/291* (2013.01); *B01D 2201/295* (2013.01); *B01D 2201/34* (2013.01); *B01D 2201/4007* (2013.01); *B01D 2201/4046* (2013.01); *B01D 2201/4053* (2013.01)

(58) Field of Classification Search
CPC .... B01D 2201/0415; B01D 2201/4053; B01D 2201/4007
USPC ....... 210/437, 440–444, 315, 337, 338, 342, 210/493.1, DIG. 5
See application file for complete search history.

(56) References Cited

U.S. PATENT DOCUMENTS

| | | | |
|---|---|---|---|
| 5,529,689 A * | 6/1996 | Korin | C02F 1/003 210/232 |
| 5,681,461 A | 10/1997 | Gullett et al. | |
| 7,070,692 B2 | 7/2006 | Knight | |
| 2014/0190881 A1 | 7/2014 | Ardes | |
| 2014/0284268 A1 | 9/2014 | Volkmer | |

\* cited by examiner

FILTER ELEMENT WITH CENTRAL ELEMENT FOR A FILTER SYSTEM

TECHNICAL FIELD

The invention relates to a filter element with central element for a filter system, in particular for a fuel filter of an internal combustion engine, as well as a filter system having such a filter element.

BACKGROUND

A fuel filter having a filter housing, having an electrical connector element on the element and having an electrical connector element on the housing, is known from DE 10 2013 009 198 A1, wherein the connector elements on the element and on the housing are electrically connected to each other when the filter element is installed in the filter housing. A guide ramp with a ramp surface is arranged in the filter housing. When the filter element is plugged into the filter housing in the axial direction relative to the filter axis, with the connector end face in the front, the connector element on the element and another segment of the connector end face impact the ramp surface. By rotating the filter element clockwise in the filter housing about the filter axis, which corresponds to the helical route of the ramp surface, with a simultaneous movement of the filter element in the axial direction toward the connector end face of the filter housing, the filter element is guided along the ramp surface. The electrical connector element on the housing is arranged on the end of the ramp surface. The connector element on the element then electrically connects to the connector element on the housing. In this way, the filter element is positioned in the correct installation position in the filter housing. The electrical connection is completed by the rotary/plug movement of the filter element.

SUMMARY

The problem addressed by the invention is that of creating a filter element for a filter system, which enables a simple and secure alignment during the assembly in a filter housing, such that the filter element can be electrically contacted in a reliable manner.

A further problem addressed by the invention is that of creating a filter system for receiving such a replaceable filter element, which enables a simple and secure alignment during the assembly in a filter housing, such that the filter element can be electrically contacted in a reliable manner.

The problems named above are addressed according to one aspect of the invention by a filter element which comprises a rotatably arranged central element, wherein the central element has one or multiple positioning elements which are included for the purpose of, when assembled as intended, interacting with one or multiple counter positioning elements of an upper housing part of a filter housing of a filter system.

Advantageous embodiments and advantages of the invention are found in the further claims, the description, and the drawings.

A filter element for filtering a fluid is suggested, having a longitudinal axis and having a filter bellows arranged about the longitudinal axis, said filter bellows comprising a first end disk on a first end face, and a second end disk on a second end face, as well as a central element arranged rotatably about the longitudinal axis relative to the filter bellows inside the filter bellows. The central element in this case has one or multiple positioning elements which are included for the purpose of, when assembled as intended, interacting with one or multiple counter positioning elements of an upper housing part of a filter housing of a filter system in order to fix the central element in the upper housing part in a defined angular position relative to the one or multiple counter positioning elements. The central element has at least one electrical connector element on the element, which when assembled as intended is included in the filter housing for electrically contacting at least one electrical connector element on the housing. The electrical connector element on the element in this case can serve the purpose of an electrical contact between a WIF sensor arranged in the central element and a heating board which is arranged in the upper housing part, via which the electrical connector element on the housing can be contacted.

According to the invention, the filter element has integrated alignment elements which allow the filter element to be aligned in a particular position during the assembly thereof. This position is advantageous for a further assembly on the filter element—by way of example, for electrical connector elements. The assembled position is achieved by an interplay of the positioning elements on the filter element and a geometry, necessary for this, of counter positioning elements on the filter housing in which the filter element is assembled. This enables control of position during assembly of a filter element.

By way of example, electrodes in the form of a so-called water-in-fuel (WIF) sensor can be situated in the filter element, with the task of reporting the level of water filtered out of the diesel fuel when a defined fill level is reached. For this purpose, an electrical connection should be established between the electrodes in the filter element and a heater arranged in the filter housing, wherein contacting pins of a board of the heater are arranged in a defined and fixed position in the filter housing relative to the filter housing.

During the assembly of the filter element in the filter housing, the filter element is inserted into the lower housing part, which is, by way of example, the cover of the filter housing, and then the lower housing part is placed on the upper housing part and bolted to the same. The filter bellows of the filter element sits in the lower housing part for this purpose, when inserted, with a first seal, which runs on the radial outside of a first end disk of the filter bellows, for example an O-ring, and is secured by the moment of friction of the seal on the inner side of the lower housing part to prevent the filter bellows from rotating relative to the lower housing part. In this way, a moment of friction on the order of 10 Nm can be transmitted, using conventional materials of O-rings, to a plastic surface, such as the lower housing part. The lower housing part, with the inserted filter element, is placed on the upper housing part and rotated in the housing axis against the upper housing part in order to screw the lower housing part into the upper housing part. In the process, the central element, which is mounted to rotate about the longitudinal axis of the filter element relative to the same, initially rotates with the filter bellows.

At this point, in order to ensure a defined end position of the filter element relative to the upper housing part, positioning elements are attached to the central element. The upper housing part has corresponding counter positioning elements. When the upper housing part is rotated with the inserted filter element, these positioning elements are "captured" by the counter positioning elements in the upper housing part after several rotations, when the filter element has been screwed far enough into the upper housing part together with the central element such that the central element remains in place and no longer changes its angular position relative to the upper housing part. Because the central element is mounted rotatably in the filter element, the lower housing part can be screwed in further with the inserted filter element, and the positioned alignment of the central element can remain fixed relative to the upper housing part, such that there can be an electrical connection of, by way of example, a WIF sensor in the central element and heater in the upper housing part, by means of contact pins.

The one or multiple positioning elements can advantageously be constructed as pins oriented parallel to the longitudinal axis. By way of example, two pins can be opposite each other on a circular periphery, the same captured by counter positioning elements in the upper housing part during a rotation of the lower housing part against the upper housing part, such that a fixed relative angular position is thereby achieved between the upper housing part and the central element of the filter element, and is preserved upon a further rotation of the lower housing part with the inserted filter element against the upper housing part. As an alternative, it can also be contemplated that capturing elements are used as positioning elements, which then engage with pins arranged in the upper housing part, and therefore are likewise held by the pins during a rotation of the lower housing part with the inserted filter element against the upper housing part, thereby fixing the relative angular position between the central element and the upper housing part.

According to an advantageous embodiment, the pins can project axially beyond the end disk which faces the upper housing part when the filter element is assembled. In this way, the pins can be easily brought into contact with the counter positioning elements on the housing when the filter element is inserted as intended into a housing. In particular, the pins can advantageously be made of plastic. In this way, the pins can be produced as continuations of a plastic end disk, by way of example, in an injection molding process. In addition, an electrical insulation is provided by plastic pins such that no short-circuit can take place upon an unintentional contact of electrical contacts with the pins. Plastic pins can also be formed easily and flexibly by molding, such that it is easy to adapt them to complex constructed space specifications.

According to an alternative embodiment, the positioning elements can be ramp segments which run peripherally on at least one radius. The ramp segments therefore have an elongation in the height dimension which corresponds to the longitudinal dimension of the filter element, and an elongation normal to the height dimension in the peripheral direction of the filter element. The truncated ends of the ramp segments in this case advantageously serve the purpose of limit stops with the counter positioning elements.

It is possible in this case that two or more ramp segments are present on the at least one radius, distributed along the periphery.

In a further embodiment, the positioning elements designed as ramp segments can project beyond the at least one electrical connector element on the element in the longitudinal direction, and/or surround the same radially. This enables an effective protection of the electrical connector element from damage.

According to an implementation, the central element can have a sleeve segment which surrounds the at least one electrical connector element on the element, wherein the ramp segments preferably lie on the outer surface thereof. In this embodiment, the ramp segments can be produced together with the sleeve body of the central element as a single, injection-molded piece. The combination of ramp segments and sleeve bodies also achieves an increased mechanical stability of the ramp segments.

According to an advantageous embodiment, the central element can be designed as a sieve filter. A sieve filter can serve the purpose of effectively separating water contained in fuel, particularly following the completion of coagulation in a coalescence medium of small emulsified water droplets into larger water droplets in the fuel. The separated water can then flow off from the bottom at the sieve filter due to gravity, and can be collected in a collection space. The water level in the collection space can then be determined by a WIF sensor arranged in the central element or connected to the same, and reported via the electrical connection in the central element. The electrical connector element in the central element, which can be contacted by an electrical connector element in the housing, serves this purpose, reporting the water level to the electrical connector element on the housing in this way.

According to an advantageous embodiment, a central tube can be arranged in the interior of the filter bellows, surrounding the central element radially, wherein the central tube has a coalescence medium, arranged flat on a radial outer side or radial inner side. A central tube or support tube can advantageously be arranged in the interior of the filter bellows to mechanically stabilize or support the filter bellows, which can be made of a mechanically less-strong material. This support function is particularly advantageous for supporting the filter bellows against the fluid pressure of the flowing fluid—by way of example, fuel in a fuel filter. If the filter element is also used for separating water in a fuel filter system, it is advantageous if the central tube is wrapped with a coalescence medium, or a coalescence medium is arranged as a mat on a radial inner surface of the central tube. In this way, it is possible to coagulate small water droplets which are emulsified in the fuel into larger water droplets in the coalescence medium, to then, by way of example, drip off in the sieve filter and thereby be filtered out of the fuel. Such a filter element can be used advantageously to separate water contained in fuel.

According to an advantageous embodiment, the second end disk can have a centering element which is included to radially center the filter element during assembly as intended in the filter housing. Because the central element is arranged to rotate relative to the filter bellows, there is a certain amount of play between the filter bellows and the central element. For this reason, it is advantageous to include at least one central element for the precise positioning of the filter bellows, and therefore the filter element, in the filter housing, which is advantageously connected to the second end disk or is produced as a single piece with the same. The filter bellows is fixed to the end disk in such a manner that the filter bellows can be favorably centered and positioned radially via the same. In addition, a reliable seal between the untreated fluid side and the treated fluid side is enabled via the same.

According to an advantageous embodiment, a first seal can be included on the first end disk, and a second seal can be included on the second end disk for the purpose of creating an appropriate seal between an untreated fluid side and a treated fluid side of the filter system and/or the surroundings. The filter element can thereby be reliably sealed in the filter housing due to the provision of radial seals both on the first end disk and on the second end disk, such that the untreated fluid side is reliably separated from the treated fluid side of the filter system, and no contamination can penetrate to the treated fluid side. Both seals can be designed as O-rings.

According to an advantageous embodiment, the second seal can be arranged on the centering element. A radial seal can be advantageously arranged on the radial periphery of the centering element which is connected to the second end disk, such that it is possible to simultaneously seal the edge of the second end disk of the filter element when the filter element is centered via the centering element.

According to an advantageous embodiment, the central element can be arranged radially inside the first and the second seal. Such an arrangement of the central element is particularly favorable because the central element is thereby arranged entirely on the treated fluid side, which is advantageous for an electrical contact with the electrical connector elements which are arranged in the central element, since it is possible to prevent contamination of the contacts in this manner.

According to a further aspect, the invention relates to a filter system for filtering a fluid, having a filter housing made of an upper housing part and a lower housing part, having a housing axis, an inlet socket arranged on the upper housing part to supply a fluid to be filter, having an outlet socket arranged on the upper housing part to discharge the filtered fluid, and having a filter element which separates an untreated fluid side from a treated fluid side in a fluid-tight manner. The filter element in this case has a filter bellows arranged about a longitudinal axis of the filter element, as well as a central element arranged rotatably, about the longitudinal axis, relative to the filter bellows, in the interior of the filter bellows. The central element has one or multiple positioning elements which are included for the purpose of interacting with one or multiple counter positioning elements of an upper housing part in order to fix the central element in the upper housing part in a defined angular position relative to the one or multiple counter positioning elements.

During the assembly of the filter element in the filter housing, the filter element is inserted into the lower housing part, which is, by way of example, the cover of the filter housing, and then the lower housing part is placed on the upper housing part and bolted to the same. The filter bellows of the filter element sits in the lower housing part, when inserted, with a first seal, which runs on the radial outside of a first end disk of the filter bellows, for example an O-ring, and is secured by the moment of friction of the seal on the inner side of the lower housing part to prevent the filter bellows from rotating relative to the lower housing part. The lower housing part, with the inserted filter element, is placed on the upper housing part and rotated in the housing axis against the upper housing part in order to screw the lower housing part into the upper housing part. In the process, the central element, which is mounted to rotate about the longitudinal axis of the filter element relative to the same, initially rotates with the filter bellows.

At this point, in order to ensure a defined end position of the filter element relative to the upper housing part, positioning elements are attached to the central element. The upper housing part has counter positioning elements for this purpose. When the upper housing part is rotated with the inserted filter element, these positioning elements are "captured" by the counter positioning elements in the upper housing part after several rotations, such that the central element remains in place and no longer changes its angular position relative to the upper housing part. Because the central element is mounted rotatably in the filter element, the lower housing part can be screwed in further with the inserted filter element and the positioned alignment of the central element can remain fixed relative to the upper housing part, such that there can be an electrical connection of, by way of example, a WIF sensor in the central element and heater in the upper housing part, by means of contact pins.

According to an advantageous embodiment, the lower housing part can be arranged to rotate against the upper housing part about the housing axis to close off the filter housing. A screw thread for the closure of the lower housing part and the upper housing part of the filter housing constitutes a very practical and cost-effective connection type. Because the lower housing part is rotated against the upper housing part, the configuration is expedient in which the counter positioning elements in the upper housing part capture and hold the positioning elements arranged on the filter element upon rotation. This provides a defined and reliable angular position of the upper housing part relative to the central element. This enables a simple and reliable electrical contact between electrical connector elements in the upper housing part and electrical connector elements in the central element.

According to an advantageous embodiment, the one or multiple counter positioning elements can be designed as radial capturing elements, which can particularly be designed as half cylinders open on one side, half rings, or ramp counter segments. The ramp counter segments can particularly be present on an inner surface of a receiving component of the upper housing part, into which the sleeve segment of the central element of the filter element, by way of example, can be inserted. Such capturing elements can easily and reliably capture positioning elements, designed as pins, of the central element when the lower housing part rotates, with the filter element inserted, against the upper housing part, and hold the same in a relative angular position. As such, a fixed angular position is preserved between the upper housing part and the central element when the lower housing part, with the filter element inserted, is further rotated. As an alternative, the radial capturing element can be arranged as positioning elements on the central element as well, and therefore on the filter element, while pins can be arranged as counter positioning elements on the upper housing part.

According to an advantageous embodiment, when the lower housing part rotates against the upper housing part about the housing axis, with the filter element inserted into the lower housing part, the one or multiple positioning elements can be captured by the one or multiple counter positioning elements and held, because the central element is mounted to rotate relative to the filter bellows and therefore the filter element. As such, a fixed angular position is preserved between the upper housing part and the central element when the lower housing part, with the filter element, is rotated relative to the upper housing part, thereby enabling a secure and reliable electrical contact between the upper housing part and the central element.

According to an advantageous embodiment, the upper housing part can have at least one electrical connector element on the housing, which can connect in a fluid-tight manner with at least one electrical connector element on the element, arranged on the filter element, when the filter housing is closed. The electrical connector element on the element in this case can serve the purpose of an electrical contact between a WIF sensor arranged in the central element and a heating board which is arranged in the upper housing part, via which the electrical connector element on the housing can be contacted.

According to an advantageous embodiment, the at least one electrical connector element on the housing can be inserted into the at least one electrical connector element on the element. The connector element on the housing can advantageously have plug pins, which can be plugged into an opening, with a socket, of the connector element on the element, in the central element, to thereby produce a reliable electrical contact. In addition, the connector element on the element is protected in this manner because the actual electrical connector socket can be accommodated in the plastic body of the central element.

According to an advantageous embodiment, the upper housing part can provide an inward receptacle to create a seal between the untreated fluid side and the treated fluid side and/or to radially center the filter element in the filter housing when interacting as intended with a centering element of the filter element. The inward receptacle can advantageously function as a counter element for the centering element arranged on the second end disk of the filter element, and by way of example, engage around the same. This receptacle can also function as a seal surface upon contacting a radial seal of the filter element arranged on the centering element, thereby ensuring a reliable seal between the untreated fluid side and the treated fluid side. Brief description of the drawings

BRIEF DESCRIPTION OF THE DRAWINGS

Further advantages are found in the following description of the drawings. Embodiments of the invention are illustrated in the drawings. The drawings, description and the claims contain numerous features in combination. A person skilled in the art will also expediently consider the features individually, and combine them into other appropriate combinations. In the drawings:

DETAILED DESCRIPTION

In the figures the same or similar components are indicated by the same reference numbers. The figures only show examples and should not be considered restrictive.

Figure 1:
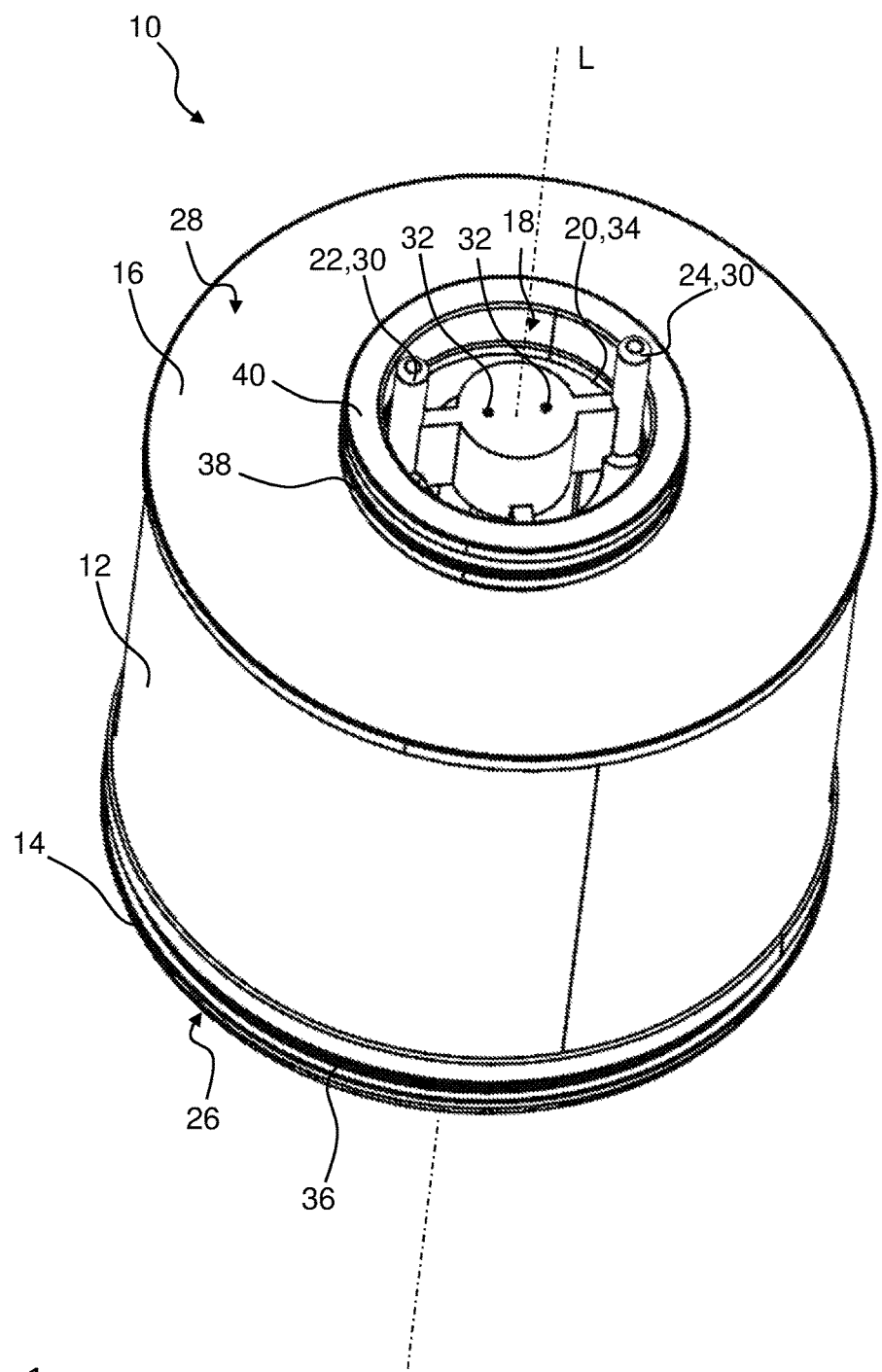
FIG. 1 shows a filter element with positioning elements according to one embodiment of the invention, in an isometric depiction.

FIG. 1 shows a filter element 10 with positioning elements 22, 24 according to one embodiment of the invention, in an isometric depiction. The filter element 10 has a filter bellows 12 arranged about a longitudinal axis L, with a first end disk 14 on a first end face 26 and a second end disk 16 on a second end face 28, such that the filter bellows 12 is closed off by the two end disks 14, 16. In addition, the filter element 10 has a central element 20 arranged to rotate about the longitudinal axis L relative to the filter bellows 12 in the interior 18 of the filter bellows 12. The central element 20 has two positioning elements 22, 24 which are included for the purpose of, when assembled as intended, interacting with two or more counter positioning elements 116, 118 of an upper housing part 114 of a filter housing 110 of a filter system 110 in order to fix the central element 20 in the upper housing part 114 in a defined angular position relative to the one or multiple counter positioning elements 116, 118. The two positioning elements 22, 24 are designed as pins 30 oriented parallel to the longitudinal axis L, wherein the pins 30, as well as the central element 20, are made of plastic. The central element 20 has two electrical connector elements 32 on the element, which are included in the filter housing 110 for the purpose of contacting electrical connector elements 120 on the housing when assembled as intended. The second end disk 16 has a centering element 40 which is included to radially center the filter element during assembly as intended in the filter housing 110, and which is designed as a collar which projects axially out of the second end disk 16. A first seal 36 is included on the first end disk 14, and a second seal 38 is included on the second end disk 16 for the purpose of creating an appropriate seal between an untreated fluid side 50 and a treated fluid side 52 of the filter system 100 and/or the surroundings. Both seals can be designed as O-rings. The second seal 38 is attached as a radial seal to the radial outer side of the centering element 40 designed as a collar. The centering element 20 is arranged radially inside of the first and the second seal 36, 38 to thereby be arranged on the treated fluid side of the filter system.

Figure 2:
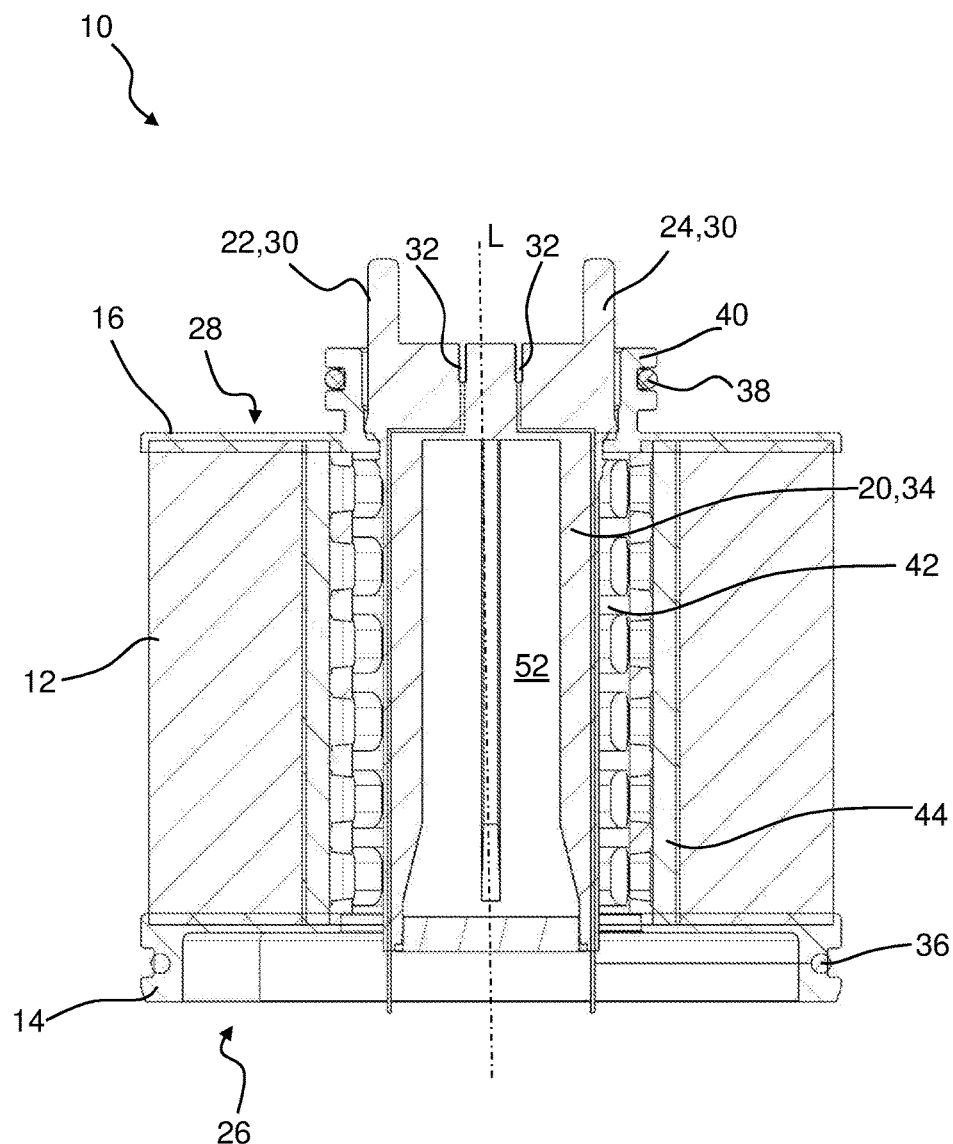
FIG. 2 shows a cutaway view of the filter element in FIG. 1.

FIG. 2 shows a cutaway view of the filter element 10 in FIG. 1. The general construction of the filter element 10 can be seen in the cross-section. The radial inner side of the filter bellows 12 is supported radially by the central tube 42 against pressure from the radial outer side of the filter bellows 12—for example, fluid pressure exerted by the flowing fluid. The central tube 42 itself is surrounded on the radial outer side thereof—that is, between the filter bellows 12 and the central tube 42—by a coalescence medium 44, which serves to coagulate smaller water droplets in the fluid being filtered—that is, fuel by way of example—into larger water droplets. The larger water droplets can then be separated by the central element 20, which is designed as a sieve filter 34. The central element 20 is mounted to rotate about the longitudinal axis L inside the central tube 42, on the treated fluid side 52 of the filter element 10. The central element 20 comprises, on the upper end in FIG. 2, the positioning elements 22, 24, as pins 30 for the purpose of positioning the central element 20 in an upper housing part 114 (illustrated in FIG. 5). Electrical connector elements 32 are also arranged in the central element 20, wherein electrical counter elements in the form of plug connectors can be connected to the same. The filter bellows 12 is closed off by the first end disk 14 on the first end face 26 and the second end disk 16 on the second end face 28. The second end disk 16 comprises the centering element 40 for precise centering in an upper housing part, wherein the radial seal 38 is arranged in the centering element 40, and the radial seal 36 is arranged in the first end disk 14, to seal the untreated fluid side 50 from the treated fluid side 52 of the filter system 100 (illustrated in FIG. 5).

Figure 3:
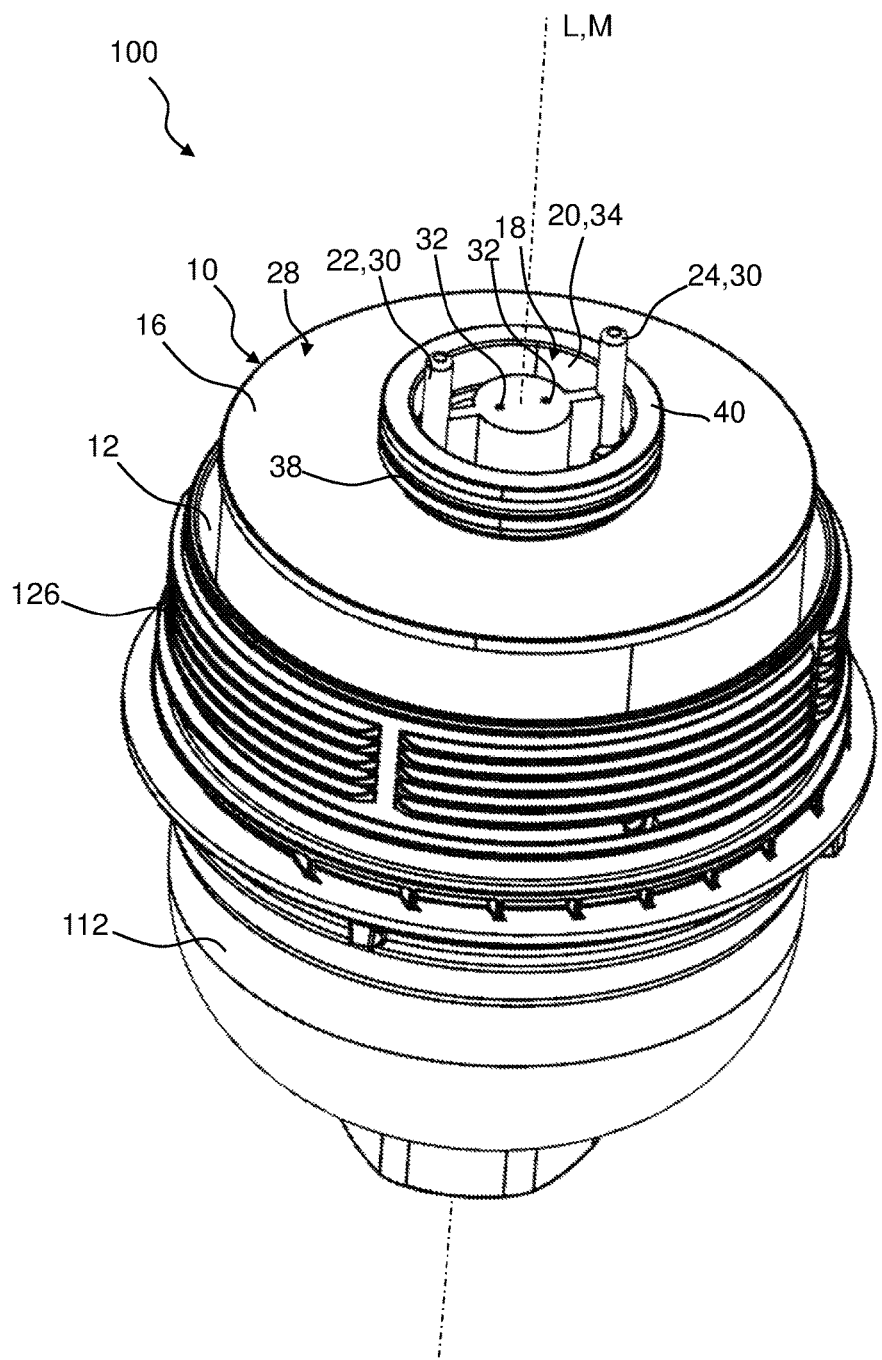
FIG. 3 shows the filter element in FIG. 1 inserted into a lower housing part, in an isometric depiction.

FIG. 3 shows the filter element 10 in FIG. 1 inserted into a lower housing part 112, in an isometric depiction. The lower housing part 112 is designed as a hollow cylindrical pot, and has a screw thread 126 on an upper edge to close the filter housing against an upper housing part 114 (see FIG. 4).

Figure 4:
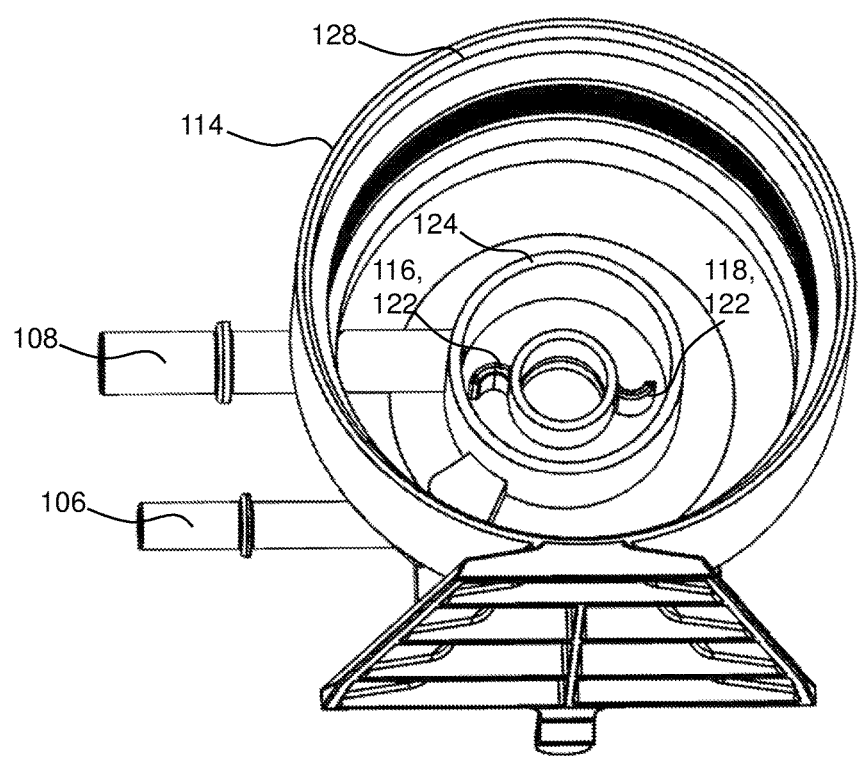
FIG. 4 shows an underside view of an upper housing part of a filter system according to one embodiment of the invention.

FIG. 4 shows an underside view of an upper housing part 114 of a filter system 100 according to an embodiment of the invention. The upper housing part 114 is likewise designed as a hollow cylindrical pot, and has a counter thread 128 on its lower, inner edge to close the filter housing 110 against the lower housing part 112 illustrated in FIG. 3. The receptacle 124, in the form of a radial socket, is arranged centrally in the interior of the upper housing part 114, as a counter element for the centering element 40 of the filter element 10, as are two counter positioning elements 116, 118 which are designed, as radial capturing elements 122, as half cylinders open on one side. An inlet socket 106 which connects radially, as well as an outlet socket 108 guided centrally out of the upper housing part 114, are arranged on the upper edge of the same.

Figure 5:
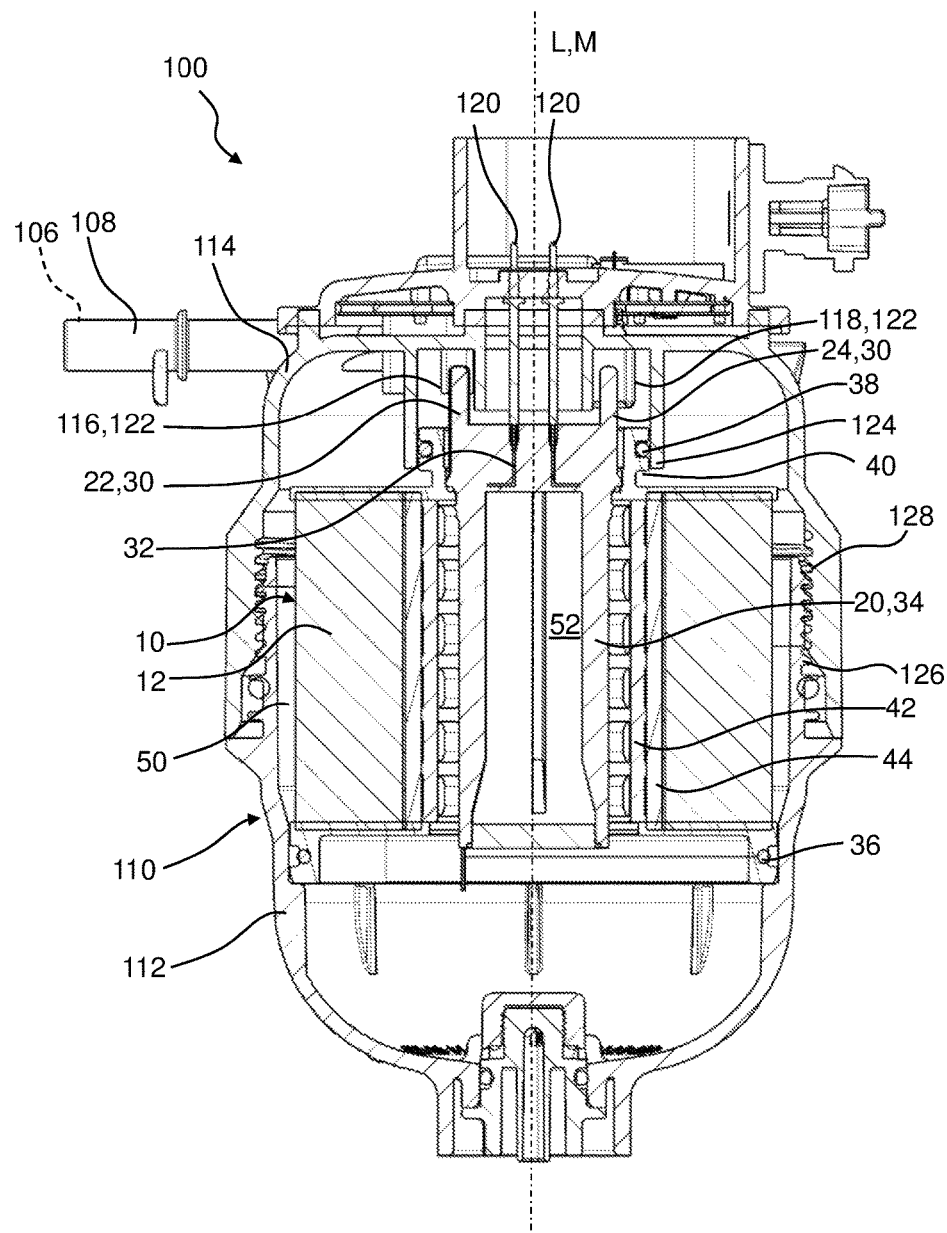
FIG. 5 shows a cutaway view of a filter system according to one embodiment of the invention, with the filter element inserted.

FIG. 5 shows a cutaway view of a filter system 100 according to an embodiment of the invention, with the filter element 10 inserted. The filter system 100 comprises the filter housing 110 composed of the upper housing part 114 and the lower housing part 112, the inlet socket 106 arranged on the upper housing part 110 to supply a fluid to be filtered, such as fuel for example, the outlet socket 108 arranged on the upper housing part 110 to discharge the filtered fluid, and the filter element 10 which separates an untreated fluid side 50 from a treated fluid side 52 in a fluid-tight manner. The filter element 10 in this case has a filter bellows 12 arranged about the longitudinal axis L of the filter element 10, as well as the central element 20 arranged to rotate about the longitudinal axis L relative to the filter bellows 12 in the interior 18 of the filter bellows 12. The central element 20 has two positioning elements 22, 24 which are included for the purpose of interacting with two counter positioning elements 116, 118 of the upper housing part 114, in order to fix the central element 20 in the upper housing part 114 in a defined angular position relative to the two counter positioning elements 116, 118. The filter system 100 has a housing axis M, wherein the longitudinal axis L of the filter element 10 lies parallel to the same when the filter element 10 is assembled in the filter housing. The positioning elements 22, 24 arranged on the connector element 20 are designed as pins 30 which engage in the radial capturing elements 122 of the upper housing part 114, which are designed as half cylinders or half rings open on one side, and when the lower housing part 112 rotates against the upper housing part 114 about the housing axis M, relative to the filter element 10, with the filter element inserted into the lower housing part 112, are captured by the radial capturing elements 122.

The central tube 42 is arranged in the interior 18 of the filter bellows 12, surrounding the central element 20 radially, wherein the central tube 20 has a coalescence medium 44 arranged flat on a radial outer side. The central tube 42 or support tube is advantageously arranged in the interior 18 of the filter bellows 12 to mechanically stabilize or support the filter bellows 12, which can be made of a mechanically less-strong material. This support function is particularly advantageous for supporting the filter bellows 12 against the fluid pressure of the flowing fluid—by way of example fuel. The filter element 10 illustrated in the embodiment in FIG. 4 is included for the purpose of separating water; for this reason, the central tube 42 is wrapped with the coalescence medium 44. In this way, it is possible to coagulate small water droplets which are emulsified in the fuel into larger water droplets in the coalescence medium 44, to then, by way of example, drip off in the central element 20 designed as a sieve filter and thereby be filtered out of the fuel.

The lower housing part 112 is arranged to rotate about the housing axis M to close the filter housing 110 against the upper housing part 114, and can be closed in a fluid-tight manner by the screw thread 126 of the lower housing part 112 engaging in the counter screw thread 128.

During the assembly of the filter element 10 in the filter housing 110, the filter element 10 is inserted into the lower housing part 112, which is, by way of example, the cover of the filter housing 110, and then the lower housing part 112 is placed on the upper housing part 114 and bolted to the same. The filter bellows 12 of the filter element 10 sits in the lower housing part 112, when inserted, with the first seal 36, which runs on the radial outside of the first end disk 14 of the filter bellows 12, for example an O-ring, and is secured by the moment of friction of the seal 36 on the inner side of the lower housing part 112 to prevent the filter bellows 12 from rotating relative to the lower housing part 112. The lower housing part 112, with the inserted filter element 10, is placed on the upper housing part 114 and rotated in the housing axis M against the upper housing part 114 in order to screw the lower housing part 112 into the upper housing part 114. In the process, the central element 20, which is mounted to rotate about the longitudinal axis L of the filter element 10 relative to the same, initially rotates with the filter bellows 12.

At this point, in order to ensure a defined end position of the filter element 10 relative to the upper housing part 114, positioning elements 22, 24 are attached to the central element 20. The upper housing part 114 has counter positioning elements 116, 118 for this purpose. When the upper housing part 112 is rotated with the inserted filter element 10, these positioning elements 22, 24 are "captured" by the counter positioning elements 116, 118 in the upper housing part 114 after several rotations, such that the central element 20 remains in place and no longer changes its angular position relative to the upper housing part 114. Because the central element 20 is mounted rotatably in the filter element 10, the lower housing part 112 can be screwed in further with the inserted filter element 10, and the positioned alignment of the central element 20 can remain fixed relative to the upper housing part 114, such that there can be an electrical connection of, by way of example, a WIF sensor in the central element 20 and heater in the upper housing part 114, by means of contact pins.

The upper housing part 114 provides the inward receptacle 124 to create a seal between the untreated fluid side 50 and the treated fluid side 52 and to radially center the filter element 10 in the filter housing 110 when interacting as intended with a centering element 40 of the filter element 10. The upper housing part 114 can also have two electrical connector elements 120 on the housing, which can connect in a fluid-tight manner with two electrical connector elements on the element, arranged on the filter element 10, when the filter housing 110 is closed. For this purpose, the electrical connector element 120 on the housing can be inserted into the electrical connector element 32 on the element.

Figure 6:
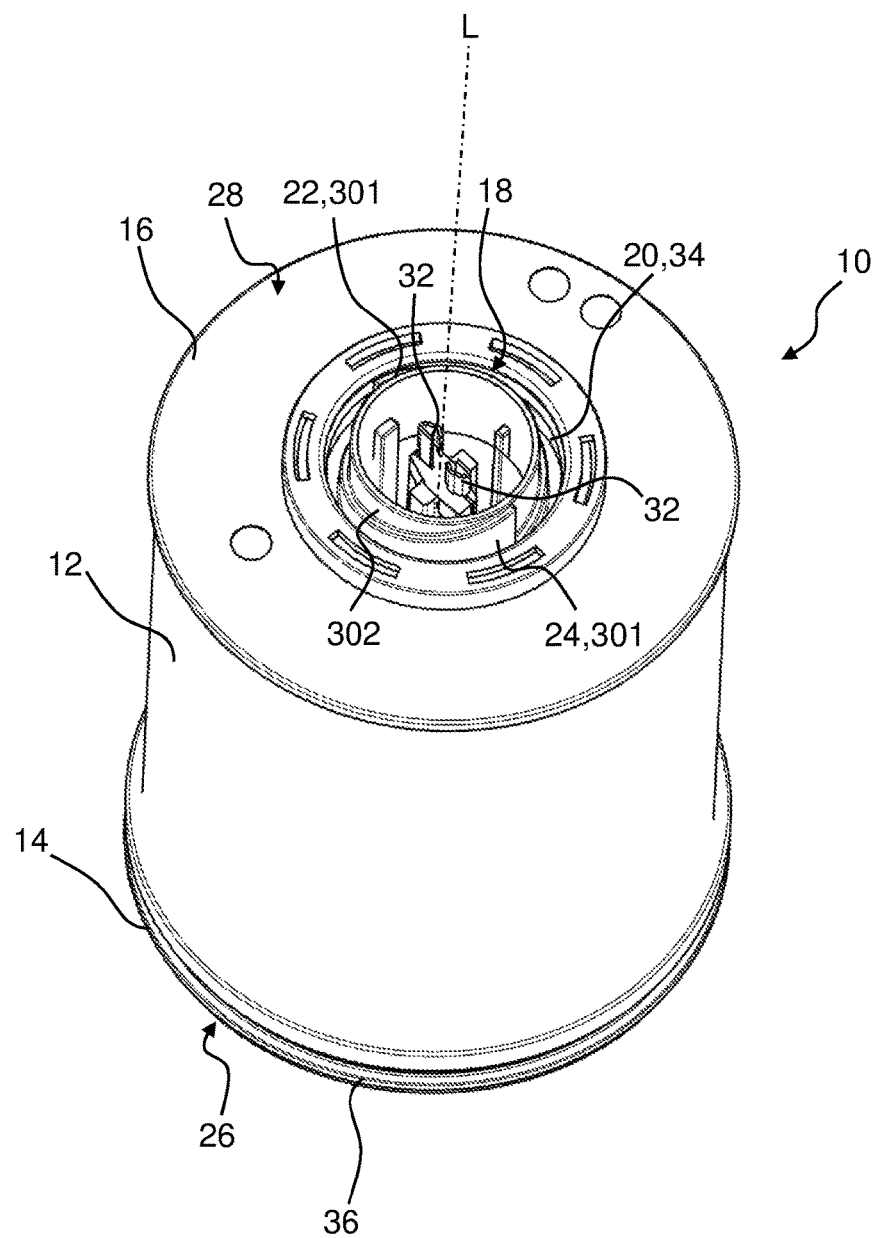
FIG. 6 shows a filter element with positioning elements according to one embodiment of the invention, in an isometric depiction.

FIG. 6 shows a further embodiment according to the invention of the filter element 10. The same has ramp segments 301 running around the periphery as positioning elements 22, 24, which are present on the outer surface of a sleeve component 302 which is part of the central element 18. The sleeve component 302, the ramp segments 301, and the central element 18 are an integrated component which can be produced in particular by an injection molding process, preferably from plastic. Two electrical connector elements 32, designed in this case as contact tongues, are situated inside the sleeve component 302, and can be brought into conductive contact with corresponding contact pins 120 of an upper housing part 114 (see FIG. 7). The sleeve component 301 and the upper axial end of the ramp segments 301 project above the electrical connector elements 32 in the axial direction, such that the same are protected from damage. This is particularly advantageous in practice in the event that the filter element 10 is dropped due to inattentiveness.

Figure 7:
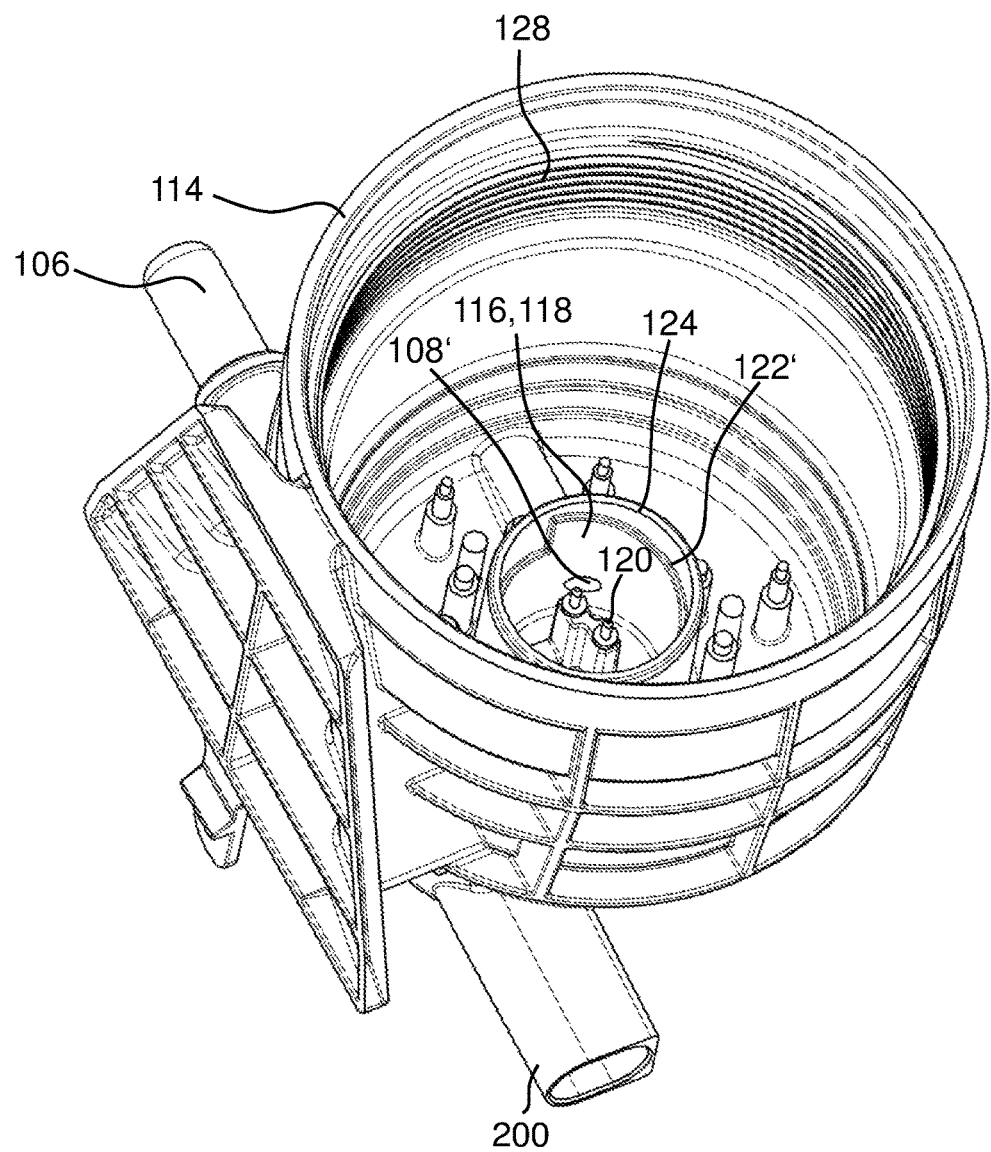
FIG. 7 shows an underside view of an upper housing part of a filter system according to a further embodiment of the invention.

The upper housing part 114 matching the filter element 10 in FIG. 6 is illustrated in FIG. 7. This substantially corresponds in terms of functionality to the upper housing part 114 in FIG. 4; The differences concern the design of the counter positioning elements 116, 118 and the electrical connector elements 120. The counter positioning elements 116, 118 are ramp counter segments 122' which correspond in dimensions and inclination to the ramp segments 301 of the filter element 10. When the filter element 10 is screwed in by means of the thread 128, after a certain installation depth the ramp segments 301 of the filter element 10 come to stop with their truncated ends on the truncated ends of the ramp counter segments 122' of the upper housing part 114, wherein the rotary movement of the central element 18 mounted rotatably in the filter element 10 is halted and the contact tongues 32 of the filter element 10 are aligned to match the contact pins 120 of the upper housing part 114. Upon a further screwing-in of the filter element 10, the contact tongues 32 are then pushed axially over the contact pins 120 and an electrically conductive contact is established.

In addition, in the illustration shown, the fluid inlet sockets 106 can be seen. Although the fluid outlet socket is hidden, a fluid outlet bore 108 which leads to the outlet socket can be seen on the inner surface of the receptacle segment, wherein the ramp counter segments 122' are present on the same as well. Pos. 200 is an electrical connector which has two pins which are themselves electrically connected to the contact pins 120.

What is claimed is:

1. A filter element for filtering a fluid, the filter element comprising:
   a filter bellows surrounding a longitudinal axis (L) extending through a central open interior of the filter bellows;
   a first end disk arranged on and secured onto a first end face of the filter bellows;
   a second end disk arranged on and secured onto a second end face of the filter bellows, the second end disk having a central opening;
   a rotatable central element arranged rotatably about the longitudinal axis (L) relative to the filter bellows and arranged within the central open interior of the filter bellows, the rotatable central element having a first axial end extending through the central opening of the second end disk,
   wherein the rotatable central element is arranged free to rotate within central open interior of the filter bellows, the rotatable central element rotating about the longitudinal axis (L), the rotatable central element rotating relative to the filter bellows and rotating relative to the second end disk of the filter bellows,
   wherein the rotatable central element comprises:
      at least one positioning element secured on the rotatable central element proximate to the first axial end,
      wherein the at least one positioning element, when assembled as intended into a filter housing, interacts with respective counter positioning elements of a filter housing of a filter system in order to rotationally fix the rotatable central element in the filter housing in a defined angular position relative to the filter housing;
   at least one electrical connector element arranged on the rotatable central element proximate to the first axial end,
   wherein, when the rotatable central element is rotationally fixed in the defined angular position in the filter housing, the at least one electrical connector element electrically contacts at least one electrical connector element of the filter housing.

2. The filter element according to claim 1, wherein the at least one positioning element is designed as pins arranged at the first axial end of the rotatable central element, oriented parallel to the longitudinal axis (L) and projecting axially outwardly beyond the second end disk.

3. The filter element according to claim 1, wherein the at least one positioning element is designed as ramp segments which run on at least one radius peripherally.

4. The filter element according to claim 3, wherein two or more ramp segments are distributed peripherally on the at least one radius.

5. The filter element according to claim 3, wherein the at least one positioning element is designed as ramp segments projecting beyond the at least one electrical connector element on the rotatable central element in the longitudinal direction (L), and/or surround the at least one electrical connector element radially.

6. The filter element according to claim 3, wherein the rotatable central element has a sleeve segment which surrounds the at least one electrical connector element on the rotatable central element,
wherein the ramp segments are arranged on an outer surface of the sleeve segment.

7. The filter element according to claim 1, wherein the rotatable central element is designed as a sieve filter.

8. The filter element according to claim 1, further comprising
a central tube arranged within the interior of the filter bellows,
wherein the central tube surrounds the rotatable central element radially,
wherein the central tube has a coalescence medium arranged flat on a radial outer side or radial inner side of the central tube.

9. The filter element according to claim 1, wherein the second end disk has a centering element surrounding the rotatable central element, the centering element configured and adapted to radially center the filter element during assembly as intended in the filter housing.

10. The filter element according to claim 1, wherein the first end disk includes a first seal arranged on the first end disk;
the second end disk includes a second seal arranged on the second end disk;
wherein the first seal and/or the second seal are configured to create an appropriate fluid seal between an untreated fluid side and a treated fluid side of the filter system and/or the surroundings.

11. The filter element according to claim 10, wherein the second seal is arranged on the centering element.

12. The filter element according to claim 10, wherein
the rotatable central element is arranged radially inside of the first and the second seal.

13. A filter system for filtering a fluid, comprising
a filter housing comprising:
  an upper housing part; and
  a lower housing part, each arranged on and surrounding a housing axis (M);
an inlet socket arranged on the upper housing part to supply a fluid to be filtered,
an outlet socket arranged on the upper housing part to discharge the filtered fluid,
a filter element arranged in an open interior of the filter housing and separating an untreated fluid side from a treated fluid side in a fluid-tight manner, the filter element comprising:
  a filter bellows surrounding a longitudinal axis (L) extending through a central open interior of the filter bellows;
  a first end disk arranged on and secured onto a first end face of the filter bellows;
  a second end disk arranged on and secured onto a second end face of the filter bellows, the second end disk having a central opening;
  a rotatable central element arranged rotatably about the longitudinal axis (L) relative to the filter bellows and arranged within the central open interior of the filter bellows, the rotatable central element having a first axial end extending through the central opening of the second end disk,
  wherein the rotatable central element is arranged free to rotate within central open interior of the filter bellows, the rotatable central element rotating about the longitudinal axis (L), the central element rotating relative to the filter bellows and rotating relative to the second end disk of the filter bellows,
  wherein the rotatable central element comprises:
    at least one positioning element secured on the rotatable central element proximate to the first axial end,
    wherein the at least one positioning element, when assembled as intended into the filter housing, interacts with respective ones at least one counter positioning element of the upper housing part of the filter housing in order to rotationally fix the central element in the upper housing part in a defined angular position relative to the at least one counter positioning element.

14. The filter system according to claim 13, wherein
the upper housing part is arranged and configured to rotate against the lower housing part about the housing axis (M) to close off the open interior filter housing.

15. The filter system according to claim 13, wherein
the at least one positioning element is designed as radial capturing elements, which are designed as half cylinders open on one side, half rings, or ramp counter segments.

16. The filter system according to claim 14, wherein
when the upper housing part rotates against the lower housing part about the housing axis (M), with the filter element inserted into the lower housing part, the at least one positioning element is carried along by the respective counter positioning elements.

17. The filter system according to claim 13, wherein
the rotatable central element comprises:
  at least one electrical connector element arranged on the rotatable central element proximate to the first axial end,
wherein the upper housing part has at least one electrical connector element on the housing, configured to connect in a fluid-tight manner with the at least one electrical connector element on the rotatable central element, arranged on the filter element, when the filter housing is closed.

18. The filter system according to claim 17, wherein
the at least one electrical connector element on the housing is configured to insert into the at least one electrical connector element on the rotatable central element.

19. The filter system according to claim 13, wherein
the upper housing part has an inward receptacle creating a seal between the untreated fluid side and the treated fluid side and/or to radially center the filter element in the filter housing when interacting as intended with a centering element of the filter element.

* * * * *